United States Patent

Sullivan

[15] 3,671,672

[45] June 20, 1972

[54] AUTOMATIC CHANNEL EQUALIZATION APPARATUS WITH DATA EQUALIZATION MODE ADAPTOR

[72] Inventor: Harold G. Sullivan, Seattle, Wash.

[73] Assignee: The United States of America as represented by the Secretary of the Air Force

[22] Filed: Feb. 18, 1971

[21] Appl. No.: 116,363

[52] U.S. Cl. ....................178/69 A

[51] Int. Cl. ....................H04l 25/02

[58] Field of Search ....................178/69 R, 69 A

[56] References Cited

UNITED STATES PATENTS 3,479,458 11/1969 Lord et al....................178/69 R

*Primary Examiner*—Kathleen H. Claffy
*Assistant Examiner*—Douglas W. Olms
*Attorney*—Harry A. Herbert, Jr. and Willard R. Matthews, Jr.

[57] ABSTRACT

Apparatus for automatically equalizing a data channel while data is being transmitted therethrough. This is accomplished by using the data itself, which is randomized, to adjust the receiving apparatus to reduce or eliminate the degrading effects of channel induced inter-symbol interference upon the reception of multilevel pulse amplitude or pulse mode modulation.

High data transmission rates are achieved by switching to a data equalization mode of operation following a training period in the conventional system probe equalization mode.

1 Claim, 2 Drawing Figures

INVENTOR.
HAROLD G. SULLIVAN
BY Harry A. Herbert Jr. and Willard R. Matthews Jr.
ATTORNEYS INVENTOR.
HAROLD G. SULLIVAN
BY Harry A. Herbert Jr. and
Willard R. Matthews
ATTORNEYS

AUTOMATIC CHANNEL EQUALIZATION APPARATUS WITH DATA EQUALIZATION MODE ADAPTOR

BACKGROUND OF THE INVENTION

This invention relates generally to automatic channel equalization apparatus and more specifically to equalization apparatus which operates continuously and automatically while data is being transmitted through a data link. Equalization as herein used constitutes the adjustment of the receiving apparatus to reduce, or eliminate, the de-grading effects of channel induced inter-symbol interference upon the reception of multiple level pulse amplitude, or pulse code, modulation.

Prior art systems for channel equalization, while in some instances automatic, suffer from two main deficiencies:

1. The criterion of best equalization, namely the setting of inter-symbol interference to zero within a restricted region about the peak channel impulse response, is sub-optimal compared to the present invention.

2. The method of control, or of adjustment, in the prior art systems is sufficiently incomplete so that in certain realistic situations the control apparatus does not function properly.

These deficiencies have been overcome by the invention of John B. Lord and Dean W. Lytle which invention is disclosed in U.S. Pat. No. 3,479,458 entitled Automatic Channel Equalization Apparatus, issued Nov. 18, 1969. However, the apparatus of Lord et al. requires that one half of the transmitter levels carry only probe information. This severly limits the transmission rate of data being handled by the system. The present invention is directed toward overcoming this limitation.

SUMMARY OF THE INVENTION

The apparatus disclosed by Lord et al. provides a dual signal that is compared with the system output. The circuitry to accomplish this limits the transmitted data levels that can be processed by the apparatus and hence limits the data transmission rate. It has been recognized that following a training period, the combination of the system output PAM (pulse amplitude modulated) detector and a digital to analog converter will provide a signal that is substantially equivalent to the dual signal provided by the Lord et al. device. The present invention comprehends means for switching from the dual signal producing circuits of the Lord et al. apparatus to the output of the combination of a digital to analog converter and the PAM detector following a given training period thereby freeing the system for data transmission operation only.

It is a principal object of the invention to provide new and improved automatic channel equalization apparatus.

It is another object of the invention to provide automatic channel equalization apparatus for continuously changing the equalization response to changing data link conditions while data is being transmitted.

It is another object of theinvention to provide automatic channel equalization apparatus that can transmit data at faster rates than currently known systems.

These together with other objects, features and advantages of the invention will become more readily apparent from the following detailed description when taken in conjunction with the accompanying drawings.

DESCRIPTION OF PREFERRED EMBODIMENT

Figure 1:
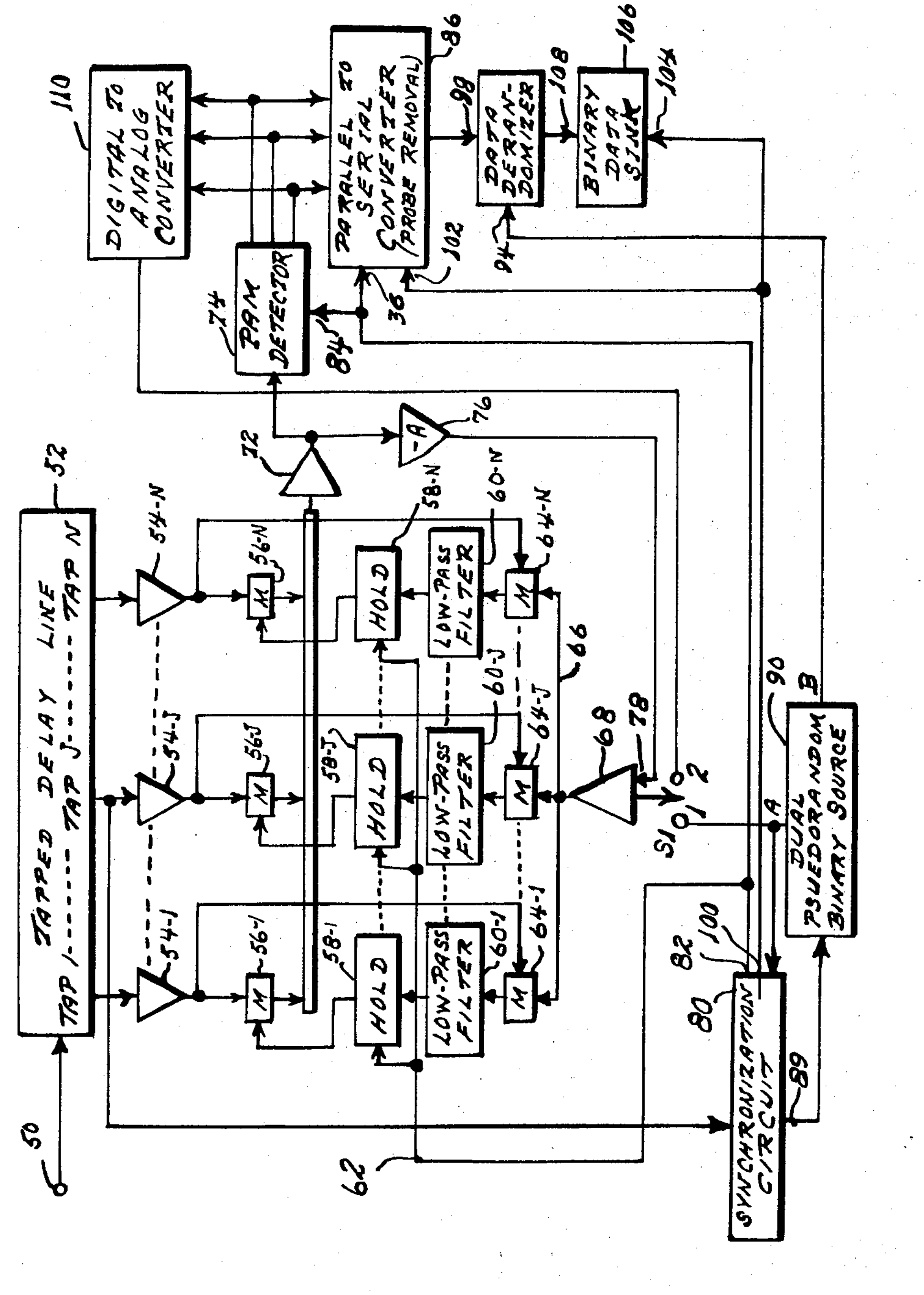
FIG. 1 illustrates one embodiment of a receiver utilizing the present invention.
Figure 2:
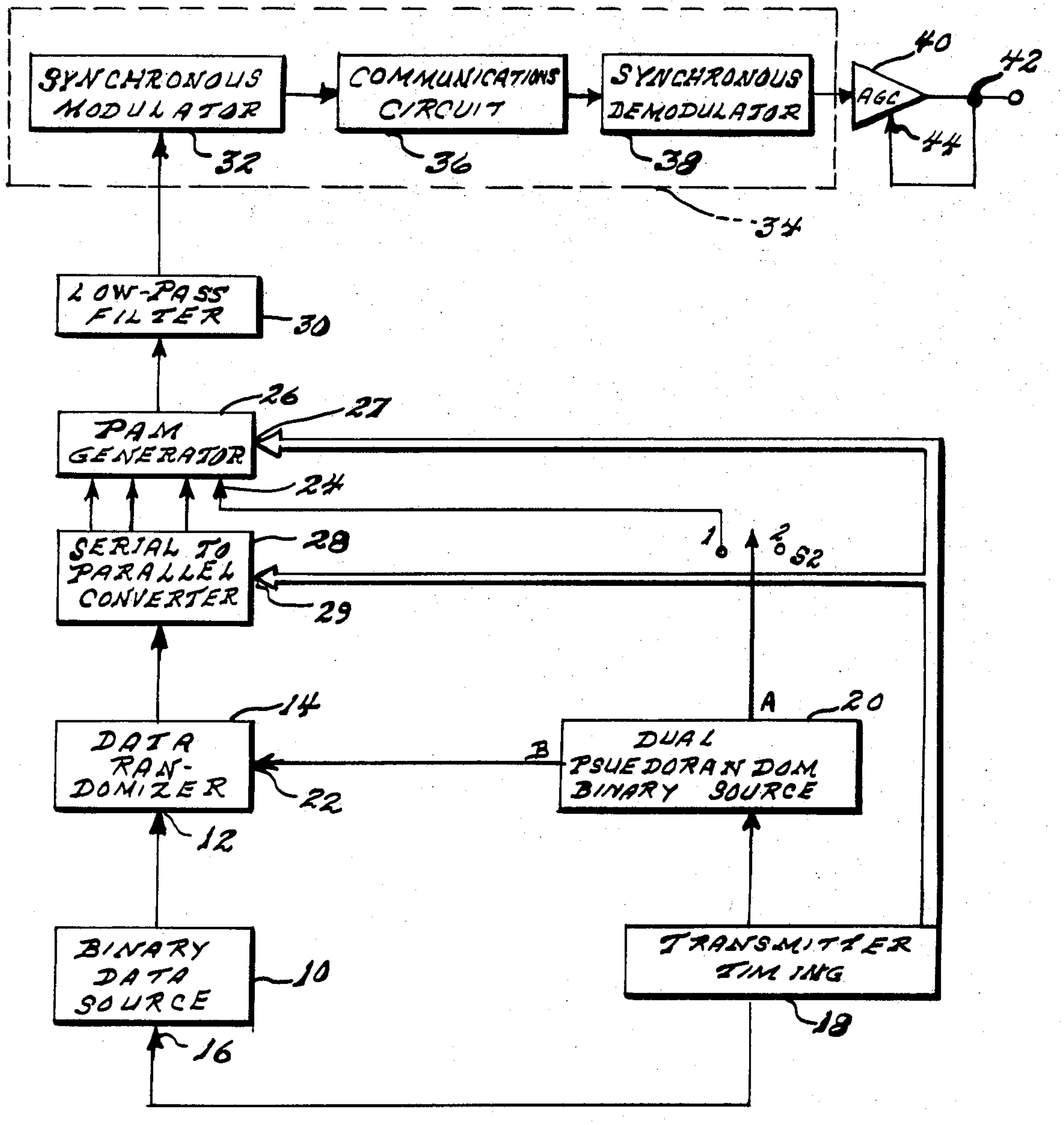
FIG. 2 illustrates one embodiment of a transmitter and data link for use with the present invention.

Referring first to FIG. 2, it will be noted that a data source 10 provides an output signal to an input 12 of a data randomizer 14. The data source 10 has an input 16 from a transmitter timing circuit 18. Timing circuit 18 also provides timing information to an input of a dual pseudo-random binary source 20. Dual pseudo-random binary source 20 has a first output on a first or B channel to provide a second input 22 to the data randomizer 14. A second or A output of source 20 is applied to an input 24 of a D/A converter or pulse amplitude modulating (PAM) generator 26. Switch S2 disconnects output A when in position 2. This occurs when Dual binary source 90 of FIG. 1 is disconnected as hereinafter described. A serial to parallel converter 28 is connected between the data randomizer 14 and the generator 26 to provide parallel inputs to the generator 26. The transmitter timing circuit 18 also provides timing inputs to the PAM generator 26 at an input 27 and to converter 28 at input 29. The PAM generator 26 provides a random, non-return to zero output through a low pass filter 30 to a synchronous modulator 32 which is part of a data link generally designated as 34 and including in addition a communication circuit 36 and a synchronous demodulator circuit 38. The output of the synchronous modulator is passed through the communications circuit 36 and to the synchronous demodulator 38. An output of the synchronous demodulator 38 is applied to an input of an automatic gain control amplifier circuit 40 which has an output 42. The output signal appearing at output 42 is fed back to a gain control input 44 on the gain control amplifier 40. The apparatus of FIG. 1 does not need an aboslutely constant input from the automatic gain control circuit 40 and could function without this unit in many instances. However, for completeness of disclosure, this circuit has been shown.

Referring now to FIG. 1, it will be noted that there is an input terminal 50 into a tapped delay line 52. Input 50 is the same as output 42 in FIG. 2. The tapped delay line 52 has output taps ranging from tap 1 through tap N with an intermediate tap J. These three taps are labeled and dots are shown to indicate many intermediate taps between the three recited taps. A plurality of amplifiers labeled 54-1, 54-J and 54-N indicate the respective taps to which these are connected. There are as many amplifiers 54 as there are taps. These amplifiers 54 are used for the purpose of impedance matching. Accordingly while they are desirable for some embodiments of the invention, they are not necessary in all embodiments. A first plurality of four-quadrant multipliers 56-1, 56-J and 56-N are also shown connected to the outputs of the amplifiers 54. Again, the multipliers 56 are connected to their respectively indicated taps. Each of the multipliers 56 has an input from an individual hold circuit 58 as represented by the hold circuits 58-1, 58-J and 58-N. Each of the hold circuits 58 has an input from a low pass filter 60. Each of the hold circuits also has an input from a conductor designated as 62. Each of the low pass filters 60 has an input from a four-quadrant multiplier 64. Each of these multipliers 64 has a common input from a conductor 66 which is attached to an output of a summing amplifier 68. Each of the multipliers 64 also has an input from the respective and corresponding 54 amplifier output. As shown, each tap is connected successively through an amplifier 54, a multiplier 56 to a common resistive summing amplifier 72. Additionally, each of the taps has a corresponding multiplier 64 receiving a common input from an amplifier 68 and providing an output through a low pass filter 60 to a hold circuit 58 and hence to the multiplier 56. The low pass filters represent one form of implementation for the integration or smoothing function required. It is not essential that the smoothing function be performed with low pass filters.

An output of summing amplifier 72 is connected to an A/D converter or PAN (Pulse amplitude modulated) detector 74 and also to an inverting amplifier 76. An output of amplifier 76 is connected to a first input 78 of the summing amplifier 68. The tap J is connected directly to a synchronization circuit 80 which has a first output 82 connected to conductor 62 and also to an input 84 of the PAM detector 74. In addition output 82 is connected to an input 86 of a parallel-to-serial converter 88. Converter 88 also receives a set of parallel inputs from the PAM detector 74. Synchronization circuit 80 has an output 89 connected to a dual pseudo-random binary source 90 which has a first or A output connected to an input 92 of amplifier 68 and has a second or B output connected to an input 94 of a data derandomizer 96. The first or A output can be disconnected from amplifier 68 by means of switch 51. Switch 51 alternately connects amplifier 68 to analog to digital converter 110 as shown. A second input 98 to the data derandomizer 96 is received from the parallel-to-serial converter 88. The input 92 from dual pseudo-random binary source 90 corresponds in characteristics to the input 24 of dual pseudo-random binary source 20 in FIG. 2. The input 94 provided by dual pseudo-random binary source 90 corresponds to input 22 of the dual pseudo-random binary source 20 in FIG. 2. An output 100 of synchronization circuit 80 is connected to provide an input 102 to the converter 88 and also to provide an input 104 to a binary data sink 106 having a second input 108 for receiving information from the data randomizer 96.

The invention about to be described will operate with any pulse amplitude modulated signal which has an average of zero and is random in nature. The signal actually shown at input 22 to produce the random characteristics is pseudo random but the invention still operates satisfactorily. In FIG. 2, the blocks 10, 14, 18, 20, 26 and 28 are utilized to produce from a binary data source this pulse amplitude modulated signal with an average of zero and having random characteristics with a predetermined random sign. Obviously, other circuitry could be used to produce this given PAM signal. The signal is then filtered by filter 30 and transmitted through data link 34. The invention requires that the data link 34 use synchronous amplitude modulation and demodulation. Although the invention will equalize data links which are chaning with time, synchronous modulation and demodulation is required to prevent rapid fluctuations of the data link 34 due to relative frequency and/or phase drifts of the carrier oscillators. At the output of the data link, the automatic gain control amplifier 40 produces a relatively constant output at terminal 42.

As previously mentioned, terminal 50 of FIG. 1 corresponds to terminal 42 of FIG. 2 and provides an input to the tapped delay line 52. The delay line 52 along with the amplifiers 54, the multipliers 56, the summing means 70, and the summing amplifier 72 comprise the equalizing filter and provides an output signal. The measurement section is used to adjust the tapped weights of the equalizing filter. In operation, the multipliers 56 are utilized to produce a weighting function for the outputs of the tapped delay line. The PAM detector 74 produces a digital output to the parallel-to-serial converter. Since the sign bit is ignored in the converter 88, the probe signal, which had been inserted at input 24 in FIG. 2, is effectively removed from the data signal. This signal is then applied through a data derandomizer to remove the effect of the data randomizer 14 in FIG. 2, and applied as binary information to the data sink 106. As will be realized, the output from amplifier 72 could be utilized by other circuitry depending upon the type of information required at the data sink.

In the specific invention shown, it is assumed that the information is obtained from the binary data source 10. This binary signal is randomized by applying it to one input of a data randomizer 14 which has a second input from the dual pseudo-random binary source 20. The converter 28 is then used to change the serial information to parallel information. The PAM generator 26 then supplies a pulse amplitude modulated signal to the low pass filter 30. In essence, the generator 26 is merely transforming the digital information to multiple-level analog amplitude information. In parallel with the inputs to the PAM generator from the converter 28 are pseudo random bits from dual pseudo-random binary source 20 at input 24. The signal at input 24 is statistically independent from that supplied to input 22 of the data randomizer 14. The signal at input 24 is utilized to change the polarity of the output from positive to negative in a random fashion such that the average is zero at the output of PAM generator 26. As will be realized, the input 24 is used as the most significant or sign bit and the PAM rate is $R = r/(K + 1)$ where the transmitter timing circuit 18 has an output to clock the binary data source and the dual pseudo-random binary source at a rate of $r$ bits per second and where K is the number of bit words into which the randomized data signal from the data randomizer 14 is divided to be applied from the converter 28 to the generator 26, and R is the PAM rate.

The PAM signal is spectrum limited by low pass filter 30. The cut-off frequency for the low pass filter 30 is located at a minumum of ½ R cycles per second, where R is the PAM rate as previously defined. While the characteristics of filter 30 are not critical, it is desirable that the filter skirt be relatively sharp at the cut-off frequency, in order to limit the PAM spectrum outside the essential frequencies. The data link, including the modulator, communications circuit and demodulator must, of course, be adequate to transmit the spectral output of low pass filter 30. The signal is transmitted through data link 34 and is supplied to output 42 of FIG. 2.

In FIG. 1, an output is taken from tap J on delay line 52 to provide synchronizing information to synchronization circuit 80. The synchronization circuit is not a part of this invention and is, therefore, not described further. It is based on cross-correlation of the output from tap J with output A from the pseudo-random binary source 90. The operation of the synchronization is fairly obvious to one skilled in the art. However, the synchronization circuit 80 does provide an output on lead 62 to energize the hold circuits at the rate R, which is the rate of transmission of PAM signals. Simultaneously, the inputs 84 and 86 to the PAM detector 74 and converter 88 respectively are energized to allow transmission of the output from summing amplifier 72 through these two units to detect and convert this information pulse. The second synchronizing signal which appears at output 100 of synchronization circuit 80, is used to gate the converter 88 and the binary data sink 106. A third output at 89 is utilized to gate the dual pseudo-random binary source 90. With this gating input, dual pseudo-random binary source 90 will provide essentially the same outputs as is provided by the dual pseudo-random binary source 20 in FIG. 2.

As previously mentioned, the blocks 52, 54 and 56 comprise an equalizing filter which is automatically adjusted to equalize the data link. The four-quadrant multipliers 56 at each tap are used to provide the proper weighting value. The sum is obtained by using a resistive adder or any other appropriate adding circuit as indicated by summing bus 70 and summing amplifier 72 in the block diagram. Source also previously indicated, the measurement section is used to establish the tap weights needed for the equalizing filter. The tap weights needed for multipliers 56 are established by measuring the pulse response to the data link and performing an iterative computation which minimizes the inter-symbol interference in the data output of the equalizing filter. This measurement section comprises in combination the dual pseudo-random binary source 90, the inverting amplifier 76, the summing amplifier 68, the four-quadrant multipliers 64, the low pass filter 60, and the hold circuits 58. While other circuitry could be used to perform this function, essentially the same function would be necessary in the circuitry to adjust the multipliers 56.

It should be realized that the operation of the invention described is merely one series of steps and that in actuality, since the circuit utilizes a feedback technique, the adjustment process is continuous and the apparatus is therefore continually striving to obtain optimum results.

The output of amplifier 72 is inverted through amplifier 76 and is summed in amplifier 68 with the A output from dual pseudo-random binary source 90. The output of this summing amplifier is fed to each of the multipliers 64. Except for the data signal, which is random with an average of zero, the output of this summing amplifier is the error (inter-symbol inference) in the equalized probe signal since the random signal from source 20 has essentially been removed by the signal from generator 90. The output of the summing amplifier 68 is then cross-correlated with the individual tap outputs. This correlation is performed by the four-quadrant multipliers 64 and the integrators or low pass filters 60. As will be noted, each individual tap output is correlated with the total or summed error signal being fed back to these multipliers by the summing amplifier 68. The cross-correlation of the error in the equalized probe signal with the tap output from each of the taps gives the proper tap weight estimate for that tap.

The individual tap weight is adjusted by the signal being applied from the hold circuits 58 to the multipliers 56 until the correlation between the error in the output from summing amplifier 68 and that particular tap output is minimized or zero. This in effect assures that the error in the output cannot be due to a misadjustment of that tap weight. This procedure also assures that the variance of the residual error in the output after all taps are adjusted cannot further be reduced by any other choice of tap weights. The long term average of the output of multipliers 64 must be zero if the equalizing filter is properly adjusted. Integrator 60 has a low frequency passband compared to the data rate. The hold circuit samples and holds the integrator output until such time as a gating signal is received from synchronization circuit 80 to sample and hold a new output. The new weighting value for each tap is then applied from the hold circuit to the multipliers 56.

While the above description has provided enlightenment to a specific embodiment of the invention, the invention broadly speaking is in the use of an algorithm for setting tap weights of an adjustable equalizing filter to compensate for changing data link characteristics.

A mathmetical derivation of the above described circuits is provided in the Lord et al. patent and will be omitted here.

As previously indicated, the modified equalizer of the present invention differs from that disclosed in U.S. Pat. No. 3,479,458 by the addition of digital-to-analog converter 110 and switch $S_1$.

With switch $S_1$ in position 1, the equalizer functions as previously disclosed. This is referred to as the probe equalization mode. With switch $S_1$ in position 2, the equalizer functions in a modified mode hereinafter called the data equalization mode. This operating mode constitutes the essence of the invention.

The equalizer disclosed by Lord et al operates by measuring the difference between the output and what the output should be. The function of the signal A from the dual pattern generator is to provide a signal at the receiver identical to the signal transmitted so that it is known at the receiver what the output should be. This difference signal is averaged so that the randomized data signal does not effect this measurement.

However, if the equalizer is already trained than by observing the output of the PAM detector 84 and digital-to-analog converter 110 combination, the output is known except for occasional errors. This is the case since a discrete-multilevel (PAM) signal is transmitted. The PAM detector measures the output and quantizes that signal to the nearest PAM level. Therefore, the output of the digital-to-analog converter can be used as the known signal input to the sum amplifier. This is accomplished by placing switch $S_1$ in position 2.

If the PAM detector were making many errors due to poor equalization, the data equalization technique would not work. Therefore, the operation of this invention requires that the system be operated with switch $S_1$ in position 1 until the equalizer is trained and then switched to position 2 for operation in the data equalization mode. The need of the training mode depends upon the number of levels transmitted and the initial error rate.

While the invention has been shown and described using analogue and mathematical techniques, it is to be realized that the invention can also be constructed using digital circuit techniques and that the invention is to be limited only by the scope of the appended claims. An example of such a conversion from analogue-to-digital techniques in a similar invention may be found in an application Ser. No. 530,515 filed Feb. 28, 1966, in the name of Robert G. Clampham et al. and assigned to the same assignee as the present invention. This application also is concerned with automatic channel equalization.

Among the advantages of the present invention are the ease of removal of the probe signal by merely disregarding the sign bit at the receiver end and the fact that the computation assures the convergence of the proper solution over a wide range of channel distortion. In addition, the alogorithm produces a set of tap weights for the equalizer which produce minimum residual inter-symbol interference (i.e., the maximum eye pattern opening, achievable for a given channel distortion and the chosen equalizer delay line length).

While a preferred embodiment of the analogue version of the invention has been shown and described, it is to be realized that changes can be made to the embodiment and still fall within the scope of the invention which comprises the apparatus for, and the method of, equalizing the received signal from a data link by adjusting tap weights on a delay line in accordance with the correlation between the output of the taps and the error signal at the output of the equalizing section of the receiver.

I claim:

1. Communications equipment comprising, in combination:

source means for supplying information signals;

first randomizing means having given randomizing characteristics and connected to said source means for randomizing the polarity of the information signals from said source means;

signal conversion means for transmitting signals through a data link, said transmission means including means for modulating a signal at the transmission end and for demodulating the signal at the receiving end of the data link;

means connecting said first randomizing means to said signal conversion means for supplying thereto the amplitude modulated signal;

automatic gain control means connected to said signal conversion means for receiving a demodulator output signal therefrom;

tapped delay means for providing a transformation of information between input means and parallel output means thereof, said tapped delay means further being connected to receive output signals from said automatic gain control means;

second randomizing means having the same randomizing characteristics as said first randomizing means, said second randomizing means including input means and output means;

switch means;

first multiplying means connected through said switch means to said output means of said second randomizing means and to said parallel outputs of said tapped delay means for multiplying the output signal from said second randomizing means times each of the parallel outputs from said tapped delay means, said first multiplying means providing a plurality of parallel output signals;

hold circuit means comprising a plurality of circuits for providing output signals which respond quickly to input signals and decay slowly in the absence of input signals;

means connecting said first multiplying means to said plurality of circuits within said hold circuit means whereby each individual circuit is connected to a separate parallel output of said first multiplying means;

second multiplying means connected to receive signals from said hold circuit means and from said first tapped delay line means whereby each signal from said tapped delay means is multiplied by a corresponding signal from said hold circuit means, said multiplying means providing parallel outputs indicative of the individual multiplications;

summing means for providing a single output signal indicative of the instantaneous summation of all input signals connected to said output means of said multiplying means;

data output means for providing a data output signal, connected to said output means of said summing means and connected to said input means of said second randomizing means for providing feedback information thereto; and, digital to analog converter means connected to said data output means and said switch means, said switch means being adapted to connect said first multiplying means alternatively with said second randomizing means and said digital to analog converter means.

* * * * *